United States Patent
LiTingTun

(10) Patent No.: US 7,956,581 B2
(45) Date of Patent: Jun. 7, 2011

(54) RECHARGEABLE BATTERY PACK

(75) Inventor: Siong LiTingTun, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 427 days.

(21) Appl. No.: 11/972,214

(22) Filed: Jan. 10, 2008

(65) Prior Publication Data

US 2009/0179618 A1 Jul. 16, 2009

(51) Int. Cl.
*H02J 7/00* (2006.01)
*H02J 7/04* (2006.01)

(52) U.S. Cl. ........ 320/134; 320/136; 320/135; 320/150; 320/149

(58) Field of Classification Search .................. 320/134, 320/136, 135, 137, 150, 151, 152, 153, 154, 320/156, 157, 127, 128, 148
See application file for complete search history.

(56) References Cited

U.S. PATENT DOCUMENTS

| | | | |
|---|---|---|---|
| 5,625,273 A | 4/1997 | Fehling et al. | |
| 5,731,686 A | 3/1998 | Malhi | |
| 5,963,019 A | 10/1999 | Cheon | |
| 6,388,426 B1 | 5/2002 | Yokoo et al. | |
| 6,577,105 B1 | 6/2003 | Iwaizono | |
| 6,819,083 B1* | 11/2004 | Patino et al. | 320/134 |
| 7,026,790 B2 | 4/2006 | Kim et al. | |
| 2001/0021092 A1* | 9/2001 | Astala | 361/90 |
| 2002/0005709 A1 | 1/2002 | Nagai et al. | |
| 2002/0079866 A1* | 6/2002 | Odaohhara | 320/150 |
| 2003/0107347 A1 | 6/2003 | Yoshizawa et al. | |
| 2003/0132732 A1* | 7/2003 | Thomas et al. | 320/134 |
| 2004/0189259 A1* | 9/2004 | Miura et al. | 320/134 |
| 2004/0212350 A1* | 10/2004 | Patino et al. | 320/134 |
| 2005/0077878 A1* | 4/2005 | Carrier et al. | 320/134 |
| 2005/0134232 A1* | 6/2005 | Yamamoto | 320/150 |
| 2005/0156574 A1* | 7/2005 | Sato et al. | 320/134 |
| 2006/0001404 A1 | 1/2006 | Ziegler et al. | |
| 2006/0055374 A1* | 3/2006 | Fujihara et al. | 320/132 |
| 2006/0119322 A1* | 6/2006 | Maleki et al. | 320/150 |
| 2006/0164041 A1* | 7/2006 | Ooshita et al. | 320/150 |
| 2006/0164042 A1 | 7/2006 | Sim | |

FOREIGN PATENT DOCUMENTS

| | | |
|---|---|---|
| EP | 1 551 088 A | 7/2005 |
| EP | 1 758 226 A1 | 2/2007 |
| EP | 1 868 274 A | 12/2007 |

* cited by examiner

*Primary Examiner* — Edward Tso
*Assistant Examiner* — Alexis Boateng
(74) *Attorney, Agent, or Firm* — Louis D. Allard; Borden Ladner Gervais LLP

(57) ABSTRACT

A battery pack comprising a power cell for providing power to a load or for receiving a charge from a charger, a first protection circuit for protecting from overvoltage and/or overcurrent conditions, and a second protection circuit for protecting from overtemperature conditions. The protection circuits independently control one or more electronic switching devices, through which passes substantially all of the current supplied by the power cell. When overvoltage and/or overcurrent conditions exist, the first protection circuit causes at least one of the switching devices to move to a non-conducting condition. Similarly, when an overtemperature condition exists, the second protection circuit causes at least one of the switching devices to move to a non-conducting condition.

25 Claims, 4 Drawing Sheets

RECHARGEABLE BATTERY PACK

BACKGROUND

1. Technical Field

The embodiments described herein relate generally to rechargeable battery packs, and in particular to a method of reducing the equivalent series resistance (ESR) of a rechargeable battery pack, such as a Li-Ion battery pack, without sacrificing safety.

2. Description of the Related Art

Rechargeable battery packs, such as Li-Ion battery packs, are commonly used in many consumer electronics such as cell phones and personal digital assistants (PDAs). FIG. 1 is a schematic diagram of a prior art rechargeable battery pack 5, such as a Li-Ion battery pack, that may be used to provide power to a passive load 10, such as a cell phone or a PDA. In some implementations, the passive load 10 is supplanted by an active element such as a battery charger, which can recharge the rechargeable battery pack 5. As seen in FIG. 1, the rechargeable battery pack 5 includes a power cell 15, such as a Li-Ion cell, a thermal protector 20 and a protection circuit module (PCM) 25 driving the load 10. The PCM 25 includes an integrated circuit control chip 30 operatively coupled to one or more electronic switching devices 35 and 40, which in FIG. 1 are modeled as MOSFETs. As is known in the art, the PCM 25 is essentially a switch that detects abnormal currents and/or voltages and disconnects the cell 15 from the load 10, or, alternatively, a charger if the rechargeable battery pack 5 is being charged. The thermal protector 20 provides protection for the rechargeable battery pack 5 from overtemperature conditions. Overtemperature conditions can have any of several causes or combinations of causes. Overtemperature conditions can damage or impair electronic components such as those in the load 10. In the event of an overtemperature condition, it may be desirable to substantially reduce current, and thereby substantially reduce delivered power, to the load 10, thereby reducing the risk of damage or impairment. The thermal protector 20 may be, for example, a thermal fuse, a thermal breaker or a positive temperature coefficient (PTC) thermistor. Thermal protector 20 may also be either non-resettable or resettable. Non-resettable thermal protectors have lower equivalent series resistance (ESR), but once tripped, a rechargeable battery pack employing the non-resettable thermal protector is essentially no longer of any use. Resettable thermal protectors have higher ESRs, but can be tripped and reset many times.

As is known in the art, ESR is one of the main parameters determining the usable energy stored in the cell 15, and thus the usable energy stored in the rechargeable battery pack 5. Lower ESR, in general, means longer operation such as longer talk times for a cell phone. In the rechargeable battery pack 5, the ESR thereof includes the internal resistance of the cell 15, the resistance of the thermal protector 20, the resistance of the electronic switching devices 35 and 40, and the resistance of any connectors and other conductors in the circuit path to the load 10. In other words, because the thermal protector 20 is in the circuit path coupling the cell 15 to the load 10, the thermal protector 20 adds to the ESR of the rechargeable battery pack 5, and the resistance of the thermal protector 20 is not negligible. The circuit control chip 30 is not in the circuit path that includes the cell 15, the thermal protector 20 and the load 10, and does not significantly contribute to the ESR.

FIG. 2 is a schematic diagram of an equivalent conceptual circuit of the rechargeable battery pack 5 that shows each of the resistance components which add to the ESR of the rechargeable battery pack 5. In particular, the equivalent circuit includes a resistor 50 that represents the resistance of the cell 15, a resistor 55 that represents the resistance of the thermal protector 20, resistors 56 and 57 that represent the resistance of the electronic switching devices 35 and 40, and a resistor 58 that represents the resistance of the connectors and other conductors in the circuit path to the load 10 (which is represented by the resistor 59).

Since, as described above, ESR is one of the main parameters determining the usable energy in a rechargeable battery pack, it would be advantageous to be able to reduce the ESR of a rechargeable battery pack in a manner that does not adversely affect the safety of the rechargeable battery pack.

BRIEF DESCRIPTION OF THE DRAWINGS

A full understanding of the invention can be gained from the following Detailed Description when read in conjunction with the accompanying drawings, in which.

DETAILED DESCRIPTION

Figure 3:
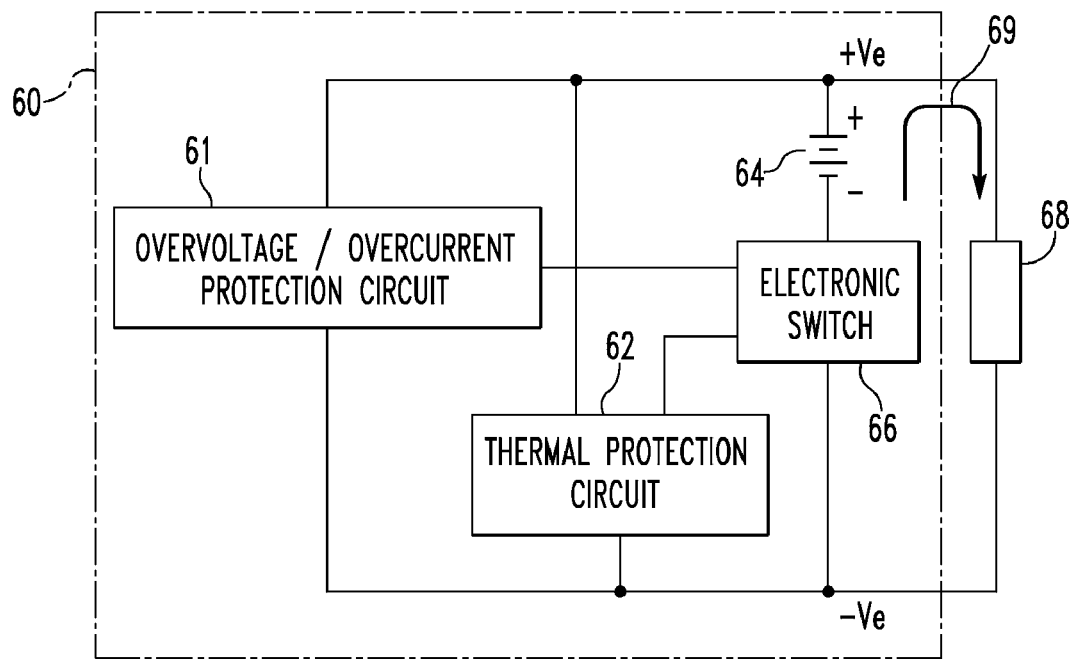
FIG. 3 is a schematic diagram of a rechargeable battery pack.

FIG. 3 is a schematic diagram of a rechargeable battery pack 60 according to one aspect of the disclosed embodiments. The rechargeable battery pack 60 provides power to a load 68 (between the upper and lower power supply rails, denoted as +Ve and −Ve) and includes a power cell 64, such as one or more Li-Ion cells. (Use of the term "battery" pack is not intended to indicate that more than one power cell 64 is necessarily employed, although in various embodiments, more than one power cell may be employed.) The rechargeable battery pack 60 further includes circuitry 61 that monitors for overvoltage and/or overcurrent conditions, and thermal protection circuitry 62 that monitors for overtemperature conditions. The rechargeable battery pack 60 also includes an electronic switch 66. The electronic switch is coupled to the power cell 64 such that substantially all of the current passing through the power cell 64 also passes through the electronic switch 66. An arrow 69 shows the direction of positive current flow in a loop that includes the power cell 64, the load 68 and the electronic switch 66. When the load 68 is supplanted by a charger, the direction of positive current flow 69 in the loop is reversed.

Currents flow through circuit loops that include the overvoltage/overcurrent circuitry 61 and the thermal protection circuitry 62. These currents, however, are negligible in comparison to the current in the loop that includes the power cell 64, the load 68 and the electronic switch 66. Under normal operation, the electronic switch 66 is "ON," that is, in a conducting condition in which it can conduct current.

The overvoltage/overcurrent circuitry 61 and the thermal protection circuitry 62 are operatively coupled to the electronic switch 66 such that the overvoltage/overcurrent circuitry 61 and the thermal protection circuitry 62 can each independently cause the electronic switch 66 to assume an "OFF" or non-conducting condition, in which the electronic switch 66 will not conduct current. When the electronic switch 66 is OFF, the loop that includes the power cell 64, the load 68 and the electronic switch 66 is effectively made open, thereby preventing the power cell 64 from supplying current to the load 68.

Figure 4:
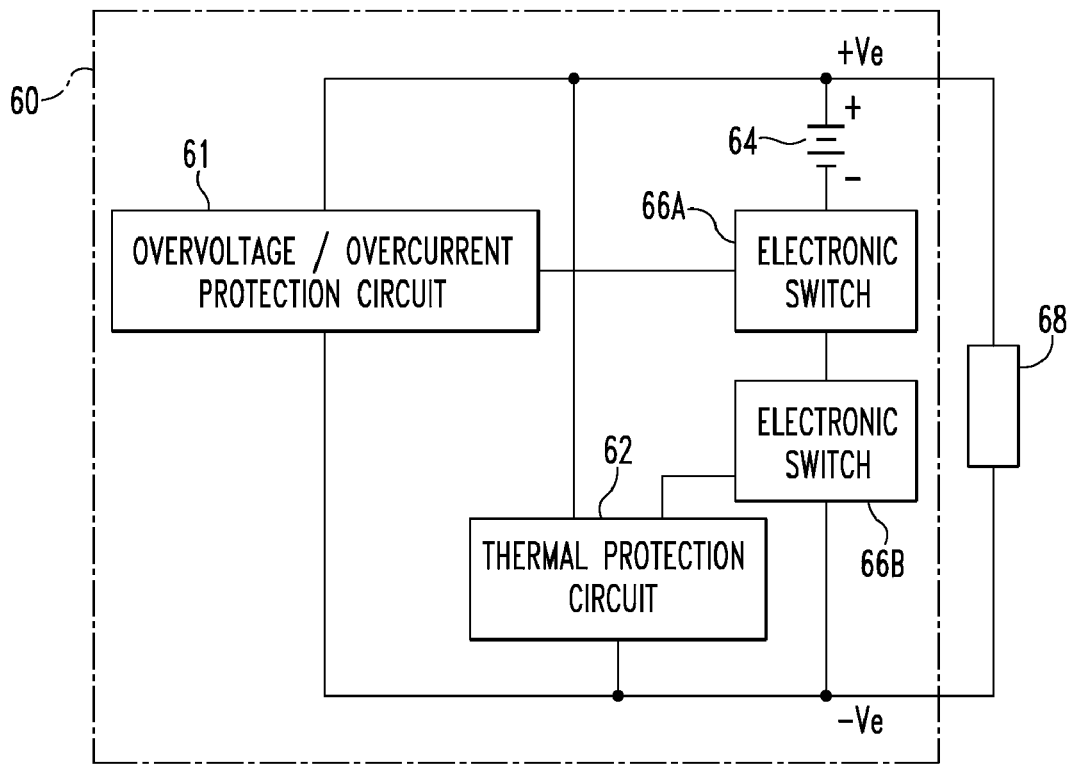
FIG. 4 is a schematic diagram of an alternate embodiment of a rechargeable battery pack.

FIG. 4 is a schematic diagram similar to FIG. 3. In FIG. 4, the overvoltage/overcurrent circuitry 61 and the thermal protection circuitry 62 each controls an electronic switch. The overvoltage/overcurrent circuitry 61 controls electronic switch 66A and the thermal protection circuitry 62 controls electronic switch 66B. The electronic switches 66A and 66B can independently be controlled to become OFF and assume a non-conducting condition. When either electronic switch 66A or 66B is in a non-conducting condition, the power cell 64 is prevented from supplying current to the load 68.

Figure 5:
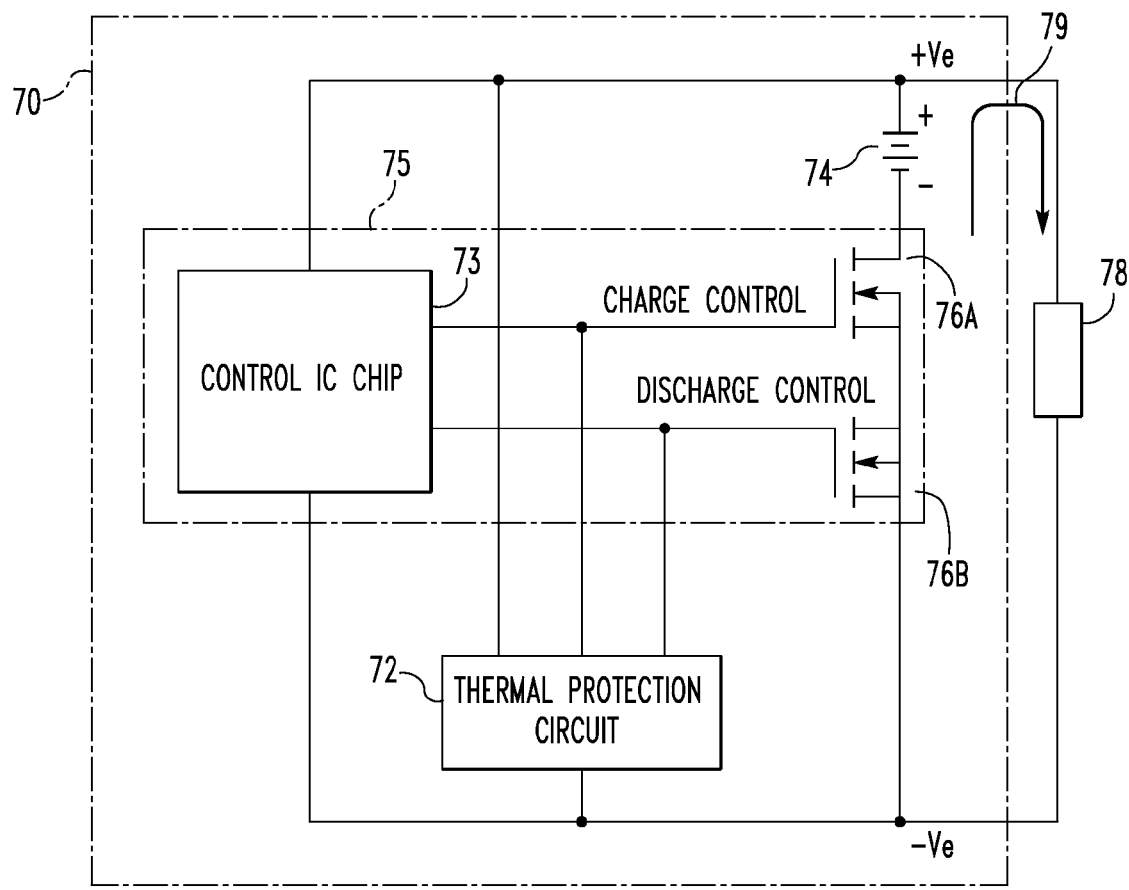
FIG. 5 is a schematic diagram of a rechargeable battery pack showing a switching configuration in more detail.

FIG. 5 is a schematic diagram of a rechargeable battery pack 70 according to another aspect of the disclosed embodiments. The rechargeable battery pack 70 provides power to a load 78 between the upper and lower power supply rails +Ve and −Ve, and includes a power cell 74, such as one or more Li-Ion cells. The rechargeable battery pack 70 further includes circuitry 75 that monitors for overvoltage and/or overcurrent conditions, and thermal protection circuitry 72 that monitors for overtemperature conditions. In operation, when the temperature within the rechargeable battery pack 70 exceeds some predetermined threshold level, one or more circuit elements in the thermal protection circuitry 72 will be caused to trip, thereby triggering a change in operation of the thermal protection circuitry 72.

Figure 1:
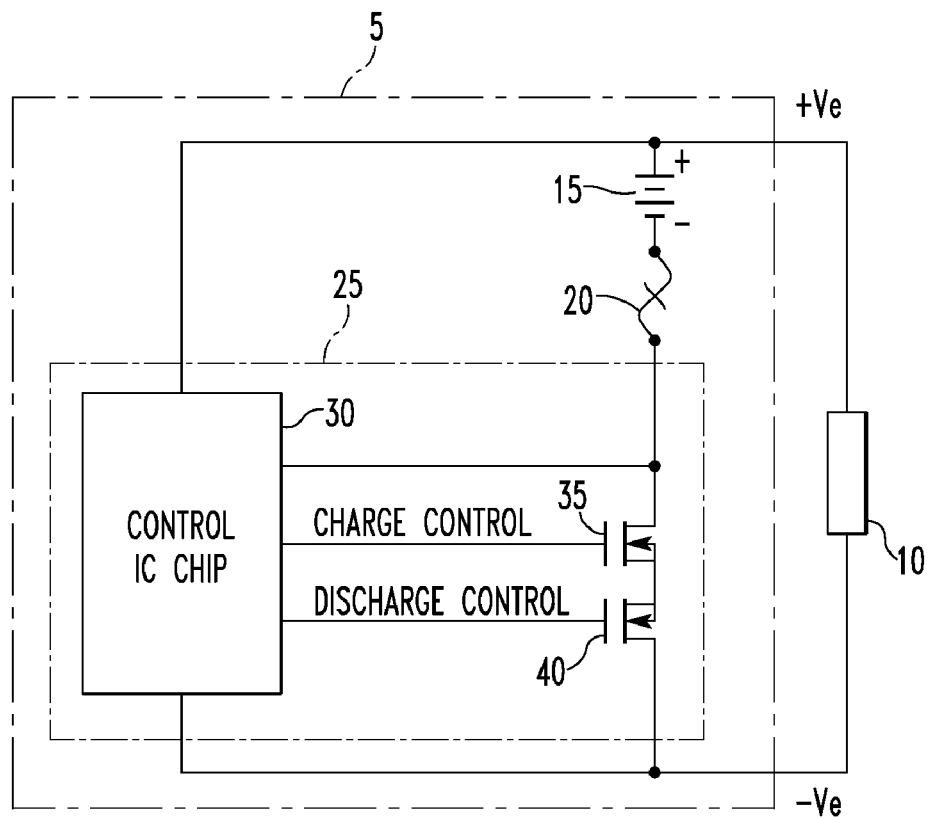
FIG. 1 is a schematic diagram of a prior art rechargeable battery pack, such as a Li-Ion battery pack, that may be used to provide power to a load, such as a cell phone or a PDA.
Figure 2:
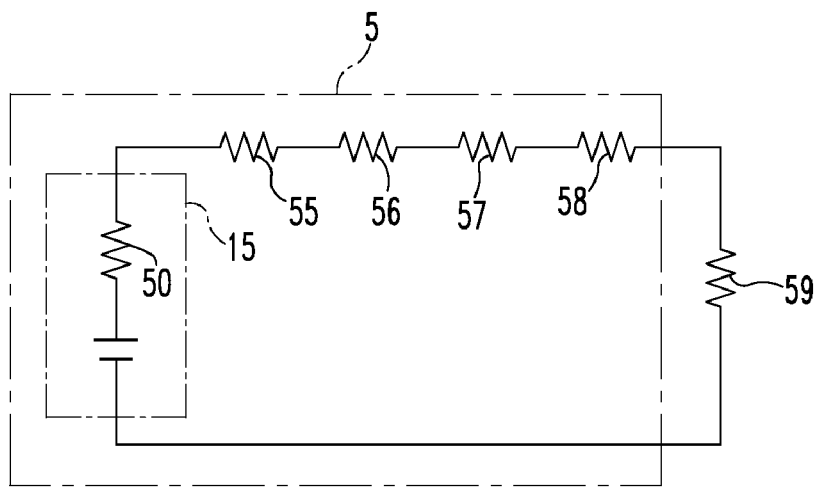
FIG. 2 is a schematic diagram of an equivalent conceptual circuit of the rechargeable battery pack shown in FIG. 1.

In the embodiment depicted in FIG. 5, the overvoltage/overcurrent circuitry 75 is similar to PCM 25 in FIG. 1, and includes an integrated circuit control chip 73 operatively coupled to one or more electronic switching devices 76A and 76B, which in FIG. 5 are modeled as MOSFETs. In the embodiment depicted in FIG. 5, the integrated circuit control chip 73 is configured to supply a voltage to a controlling terminal of the electronic switching devices 76A and 76B, particularly, the gates of electronic switching devices 76A and 76B, causing the electronic switching devices 76A and 76B to be ON during normal operation. Either the integrated circuit control chip 73 or the thermal protection circuitry 72 can independently cause the electronic switching devices 76A or 76B, or both, to turn OFF. An arrow 79 shows the direction of positive current flow in a loop that includes the power cell 74, the load 78 and the electronic switches 76A and 76B. When either the electronic switch 76A is OFF or the electronic switch 76B is OFF or both are OFF, the loop current 79 effectively goes to zero.

In FIG. 5, the electronic switch 76A is directed to charge control and the electronic switch 76B is directed to discharge control. Separate electronic switches to control discharge (in which the direction of positive current flow is in the direction shown by arrow 79) and charge (in which the direction of positive current flow is in the direction opposite that shown by arrow 79) are advantageous in that some transistors are more effective in cutting off current flow in particular directions. As a result, two electronic switches are better able to cut off current flow regardless of the direction of current flow 79. This disclosure does not require, however, that separate electronic switches be provided for charge and discharge.

Figure 6:
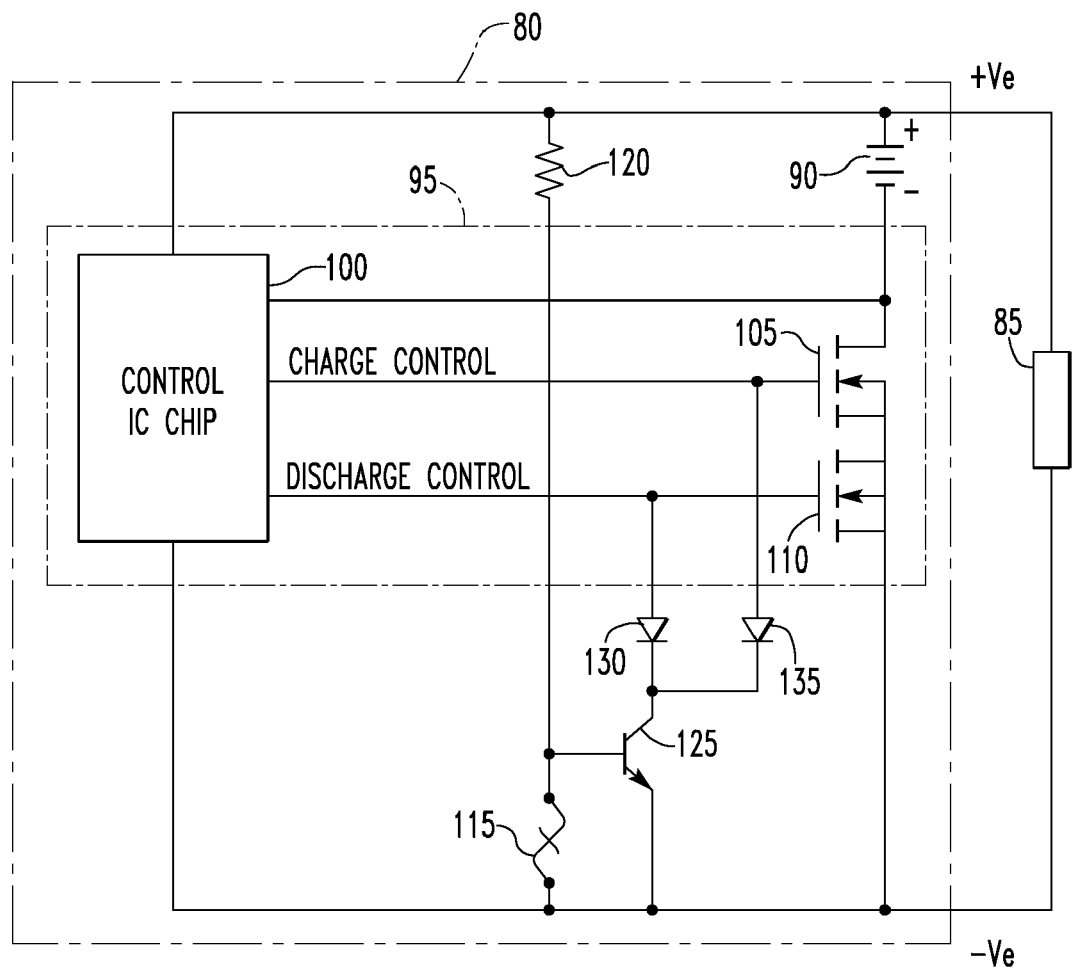
FIG. 6 is a schematic diagram of a rechargeable battery pack showing in further detail one embodiment of the rechargeable battery pack.

FIG. 6 is a schematic diagram of a rechargeable battery pack 80, such as a Li-Ion battery pack, according to one aspect of the disclosed embodiments, which has a reduced ESR without sacrificing safety. The rechargeable battery pack 80 provides power to a load 85 between the power supply rails +Ve and −Ve and includes a power cell 90, such as one or more Li-Ion cells, and a PCM 95. The PCM 95 includes an integrated circuit control chip 100 operatively coupled to electronic switching devices 105 and 110, which are modeled in FIG. 6 as MOSFETs but which may comprise any electronic switching component or circuitry under the control of the integrated circuit control chip 100. The power cell 90 is coupled to the electronic switching devices 105 and 110 such that substantially all current passing through the power cell 90 also passes through the electronic switching devices 105 and 110. When the electronic switching devices 105 and 110 are ON, the electronic switching devices 105 and 110 are in a conducting condition, and current passes through the power cell 90. When the electronic switching devices 105 and 110 are OFF, the electronic switching devices 105 and 110 are in a non-conducting condition, and effectively no current passes through the power cell 90, thereby cutting off the power cell 90 as a power source for load 85.

As shown in FIG. 6, the power cell 90 may continue to deliver current to other electronic components, such as the PCM 95, when the electronic switching devices 105 and 110 are OFF. These other currents, however, are negligible in comparison to currents passing through the load 85 under normal operating conditions. In a typical implementation, over ninety-nine percent of the current passing through the power cell 90 would pass through the load 85, and less than one percent would pass through other components of rechargeable battery pack 80. In other words, substantially all of the current passing through the power cell 90 passes through the load 85, and substantially all of the current passing through the power cell 90 also passes through the electronic switching devices 105 and 110.

Whether the electronic switching devices 105 and 110 are ON or OFF is under the control of integrated circuit control chip 100, which is responsive to overvoltage and over current conditions. As discussed below, however, whether the electronic switching devices 105 and 110 are OFF can also be controlled by thermal protection circuitry that is responsive to overtemperature conditions. Concerns about overvoltages, overcurrents and overtemperature conditions are similar whether cell 90 is supplying power during ordinary operation or consuming power during recharging (although overvoltage is generally not a problem when the power cell 90 is coupled to a passive load 85, but overvoltage can be a concern during recharging). For simplicity, the focus below will assume that the cell 90 is supplying power to the passive load 85.

The rechargeable battery pack 80 further includes a thermal protector 115 for providing overtemperature protection for the rechargeable battery pack 80. However, unlike the thermal protector 20 in the rechargeable battery pack 5 shown in FIG. 1, the thermal protector 115 is not provided in the circuit path that includes the cell 90 and the switching devices 105 and 110 for providing power to the load 85. Rather, the thermal protector 115 is removed from that circuit path and instead is, as shown in FIG. 6, provided in a separate circuit path. The thermal protector 115 may be, for example, a thermal fuse, a thermal breaker or a positive temperature coefficient (PTC) thermistor. Because the thermal protector 115 is not provided in the circuit path to the load 85, it does not add to the ESR of the rechargeable battery pack 80, thereby reducing the ESR as compared to the prior art rechargeable battery pack 5 shown in FIG. 1.

Nearly all of the current passing through the thermal protector 115 passes through a resistor 120. The resistor 120 is provided to bias the electronic switching device 125 ON when the thermal protector 115 trips and the impedance of the thermal protector 115 goes from low to high. The resistor 120 is further sized to have a large impedance in comparison to the load 85, such that most current passing through the cell 90 will pass through the load 85, and the current flowing through the thermal protector 115 will be comparatively low. In ordinary operation, the impedance of the load 85 would be in the range of a few ohms. The resistor, by comparison, might be sized in the range of tens of thousands of ohms, such as fifty thousand ohms. Current flowing through the load 85 is in the range of several amperes, and current flowing through the resistor 120 is in the range of millionths of an ampere. Current flowing through the integrated circuit control chip 100 is also very small in comparison to current flowing through the load 85 under normal operating conditions. As a result, currents flowing through other loops in rechargeable battery pack 80 are negligible in comparison to current flowing through the load 85. During recharging, currents passing through the cell 90 may not be of the same magnitudes as in the case when the cell 90 is supplying power to a passive load, but currents supplied to the overvoltage/overcurrent circuitry and the thermal protection circuitry generally remain negligible, and substantially all of the current supplied by the charger passes through the cell 90 and the electronic switching devices 105 and 110.

The electronic switching device 125 in FIG. 6 is modeled as an NPN bi-polar junction transistor, but electronic switching device 125 can also be realized as a PNP bi-polar junction transistor, or other transistor or combination of transistors. When the electronic switching device 125 turns ON, it robs the drive to the switching devices 105 and 110, and they turn OFF, thereby cutting off the load 85 from the cell 90. When the thermal protector 115 in ON (operating normally), the electronic switching device 125 cannot be biased ON since the thermal protector 115 itself is robbing the bias from the base of the electronic switching device 125.

As seen in FIG. 6, the thermal protector 115 is operatively coupled to the electronic switching devices 105 and 110 through the electronic switching device 125 and the diodes 130 and 135. In operation, when the temperature within the rechargeable battery pack 80 exceeds some predetermined threshold level, the thermal protector 115 will be caused to trip. When this happens, the electronic switching devices 105 and 110 are caused to turn OFF (assume a non-conducting condition), effectively interrupting the current path from the power cell 90 through the load 85. In particular, under normal operation, the electronic switching devices 105 and 110 are controlled by the outputs of the integrated circuit control chip 100 to be ON, the electronic switching device 125 is OFF, and effectively no current flows into the collector node (where the junction of the cathodes of the two diodes 130 and 135 connect) because the collector-to-emitter connection behaves like an open circuit. This means that the two diodes 130 and 135 are essentially out of the picture, because the diodes 130 and 135 are not conducting and behave like open circuits. The electronic switching device 125 is OFF because the thermal protector 115 in ON (typically at a relatively low impedance). As described above, thermal protector 115 robs the base drive current flowing through the resistor 120, effectively bypassing the base of electronic switching device 125. When the thermal protector 115 trips due to a high temperature, the impedance of the thermal protector 115 changes from a low impedance to a high impedance. Current now flows through the resistor 120 to the base of electronic switching device 125.

As a result, the electronic switching device 125 turns ON, driving the collector voltage down, close to the emitter voltage. The result is that the voltage at the collector node, to which the cathodes of the diodes 130 and 135 are connected, is also driven low. As a result, the diodes 130 and 135 turn ON and conduct current. This then robs the drive of the integrated circuit control chip 100 to the electronic switching devices 105 and 110, thereby turning them both OFF. Thus, the implementation described herein effectively causes the control electronic switching devices 105 and 110 of the PCM 95 to act as temperature-dependent switches (on top of their other duties in the PCM 95 as required by the integrated circuit control chip 100). In this sense, the temperature cutoff protection provided by the thermal protector 115 is independent, meaning that it is not under the control of any controller or processor, and in particular not under the control of the integrated circuit control chip 100.

In a variation of the embodiment depicted in FIG. 6, a thermal protector 115 can be utilized that has a very high impedance during normal temperature conditions, and a low impedance during overtemperature conditions. With such a thermal protector 115, the electronic switching device 125 can be eliminated and the thermal protector 115 can be directly coupled between the lower power rail and the cathodes of the diodes 130 and 135. In normal operating conditions, the impedance of the thermal protector 115 is high, and virtually no current is able to flow through the thermal protector 115. As a result, the diodes 130 and 135 are OFF. In overtemperature conditions, however, the impedance of the thermal protector 115 is low, effectively pulling down the cathode voltage of the diodes 130 and 135, turning them ON and turning OFF the electronic switching devices 105 and 110. In this variation, the thermal protector 115 can serve both as a temperature-sensitive element and as a switching element to turn ON diodes 130 and 135.

Figure 7:
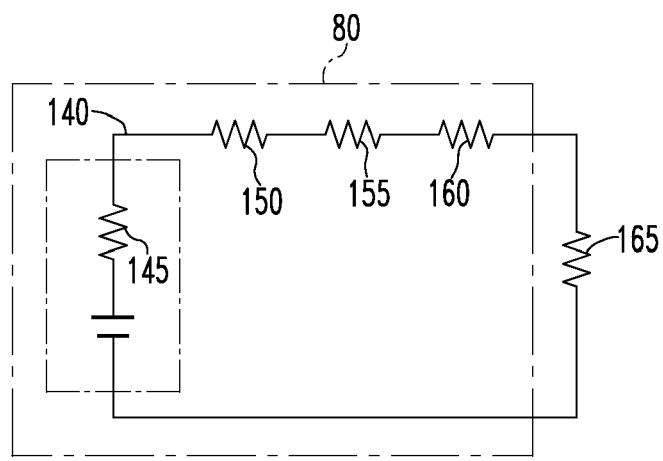
FIG. 7 is a schematic illustration of an equivalent conceptual circuit for the rechargeable battery pack shown in FIG. 6.

FIG. 7 is a schematic illustration of an equivalent conceptual circuit 140 for the rechargeable battery pack 80. The equivalent circuit 140 includes a resistor 145 that represents the resistance of the cell 90, resistors 150 and 155 that represent the resistance of the electronic switching devices 105 and 110, and a resistor 160 that represents the resistance of connectors and other conductors in the series path to the load 85 (which is represented by the resistor 165). As can be seen in FIG. 7, the circuit path that includes the cell 90 and the electronic switching devices 105 and 110, which provide power to the load 85, does not include any resistance that is attributable to the thermal protector 115, because any resistance that is attributable to the thermal protector 115 is negligible. As described above, nearly all current passing through the 90 cell passes through the load 85, while a much smaller and comparatively insignificant amount of current flows through the thermal protector 115 and other circuit elements.

The circuit described above may realize one or more advantages. Because the thermal protector 115 is not provided in the circuit path that includes the cell 90 and the load 85 and because the circuit path that includes the resistor 120 and the thermal protector 115 has a comparably higher impedance, very low currents will flow through the thermal protector 115. This disclosure is not limited to any particular amount of current flowing through thermal protector 115, but in general, the amount of current flowing through thermal protector 115 is negligible, such that thermal protector 115 has a negligible effect upon the ESR. Because very low currents will flow through the thermal protector 115, a smaller, typically less expensive component can be utilized as the thermal protector 115.

In addition, in the case where the thermal protector 115 is a positive temperature coefficient (PTC) thermistor, the effect of residual high post-trip resistance (that is often the case with PTC thermistor) will not add to the ESR of the rechargeable battery pack 80. More specifically, as is known, once tripped, the resistance of a PTC thermistor never quite relaxes back to its original level, but rather settles at a higher level (this is the high post-trip resistance cited above). Thus, when a PTC thermistor is used in the circuit path that includes a cell in a rechargeable battery, as is the case in the rechargeable battery pack 5 of FIG. 1, the fact that post-trip resistance is increased adds to the ESR of the battery pack 5 in FIG. 1. An increased post-trip resistance in the configuration of FIG. 6, however, would not necessarily result in a corresponding increase in ESR.

Thus, the rechargeable battery pack 80 provides a reduced ESR, and therefore increased battery time. Increased battery time results in increased device usage time between chargings. Further, the configuration depicted in FIG. 6 protects against overvoltage, overcurrent and overtemperture conditions, thereby effectively preserving the safety of the rechargeable battery pack 80.

While various embodiments have been described and illustrated above, it should be understood that these are exemplary and are not to be considered as limiting. Additions, deletions, substitutions, and other modifications can be made without departing from the spirit or scope hereof. The described devices and techniques are not limited to the particular circuit elements shown. In particular and without limitation, various transistors and switching elements in FIG. 6 need not employ the particular circuit elements shown, but may include different transistors or switching elements. In addition, the particular circuit elements may be, but need not be, arranged as depicted in the Figures. For example, if integrated circuit control chip 100 includes a housing, components of the thermal protection circuitry, such as the thermal protector 115 or the electronic switching device 125, may be employed inside the housing and need not be physically separate from the integrated circuit control chip 100.

Further, various embodiments may include elements not depicted in any of the figures. For example, circuit elements depicted as directly coupled may be coupled via one or more intermediate elements, such as a resistor or diode. In particular and without limitation, the electronic switching devices 105 and 110 in FIG. 6 could be coupled via resistors to the integrated circuit control chip 100. Accordingly, these and other embodiments are within the scope of the following claims.

What is claimed is:

1. A rechargeable battery pack, comprising:
   a power cell;
   a protection circuit module, said protection circuit module including a control circuit operatively coupled to an electronic switching device, said power cell and said electronic switching device being in an electrical connection in which substantially all of the current passing through said power cell passes through said electronic switching device, wherein when one or both of an overvoltage and overcurrent condition exists, said control circuit controls said electronic switching device to cause said electronic switching device to assume a non-conducting condition; and
   a thermal protection circuit operatively coupled to said electronic switching device and said power cell, said thermal protection circuit receiving a negligible current from said power cell, wherein in response to a temperature within said rechargeable battery pack exceeding a threshold value, said thermal protection circuit controls said electronic switching device to assume a non-conducting condition.

2. The rechargeable battery pack according to claim 1, wherein said electronic switching device is a first electronic switching device, and wherein said thermal protection circuit comprises:
   a diode, an anode of said diode being coupled to a controlling terminal of said electronic switching device; and
   a second electronic switching device being coupled between a cathode of said diode and a lower power rail, wherein said second electronic switching device is configured to assume a conducting condition when a temperature within said rechargeable battery pack exceeds said threshold value.

3. The rechargeable battery pack according to claim 2, wherein said second electronic switching device comprises a thermal protector element having a low impedance when said temperature within said rechargeable battery pack exceeds said threshold value, and otherwise has a high impedance.

4. The rechargeable battery pack according to claim 2, wherein said second electronic switching device comprises a bipolar junction transistor.

5. The rechargeable battery pack according to claim 1, wherein said electronic switching device is a MOSFET.

6. The rechargeable battery pack according to claim 1, wherein said thermal protection circuit comprises a thermal fuse.

7. The rechargeable battery pack according to claim 1, wherein said thermal protection circuit comprises a positive temperature coefficient thermistor.

8. The rechargeable battery pack according to claim 1, wherein said thermal protection circuit comprises a thermal breaker.

9. The rechargeable battery pack according to claim 1, wherein said power cell is a Li-Ion cell.

10. A method of operating a rechargeable battery pack, comprising:
    employing a power cell to supply current;
    employing an electronic switch to conduct substantially all of the current passing through the power cell when the electronic switch is in a conducting condition, and to prevent substantially all of the current from passing through the power cell when the electronic switch is in a non-conducting condition;
    employing a thermal protection circuit to monitor for an overtemperature condition and to cause the electronic switch to assume the non-conducting condition when the overtemperature condition exists; and
    providing a negligible current from the power cell to the thermal protection circuit.

11. The method according to claim 10, further comprising employing a first protection circuit to monitor for one or both of an overvoltage condition and an overcurrent condition, and to cause the electronic switch to assume the non-conducting condition when at least one of the overvoltage condition and the overcurrent condition exists.

12. The method according to claim 11, wherein the first protection circuit is further employed to cause the electronic switch to assume the conducting condition.

13. The method according to claim 10, wherein an overtemperature condition exists when a temperature within the rechargeable battery pack exceeds a threshold value.

14. The method according to claim 10, further comprising employing the electronic switch, following causing the electronic switch to assume the non-conducting condition when the overtemperature condition exists, to cause the electronic switch to assume the conducting condition when the overtemperature condition no longer exists.

15. The method according to claim 10, further comprising, when a passive load is electrically coupled to the battery pack, providing substantially all of the current from the power cell to the load when the electronic switch is in the conducting condition, and preventing the load from receiving substantially all of the current from the power cell when the electronic switch is in the non-conducting condition.

16. A rechargeable battery pack, comprising:
   a power cell;
   a first electronic switching device operatively coupled to the power cell in which current passing through the power cell passes through the first electronic switching device when first electronic switching device is in a conducting condition;
   a second electronic switching device operatively coupled to the power cell in which current passing through the power cell passes through the second electronic switching device when the second electronic switching device is in a conducting condition;
   a first protection circuit module operatively coupled to the first electronic switching device and configured to cause the first electronic switching device to assume a non-conducting condition when one or both of an overvoltage and overcurrent condition exists; and
   a second protection circuit module operatively coupled to the second electronic switching device and configured to cause the second electronic switching device to assume a non-conducting condition when a temperature in the rechargeable battery pack exceeds a threshold value.

17. The rechargeable battery pack according to claim 16, wherein the first electronic switching device and the second electronic switching device are the same electronic switching device.

18. The rechargeable battery pack according to claim 16, wherein said second protection circuit comprises:
   a diode, an anode of said diode being coupled to a controlling terminal of said second electronic switching device; and
   a third electronic switching device being coupled between a cathode of said diode and a lower power rail, wherein said third electronic switching device is configured to assume a conducting condition when a temperature within said rechargeable battery pack exceeds said threshold value.

19. The rechargeable battery pack according to claim 18, wherein said third electronic switching device comprises a thermal protector element having a low impedance when said temperature within said rechargeable battery pack exceeds said threshold value, and otherwise has a high impedance.

20. The rechargeable battery pack according to claim 19, wherein said thermal protector element comprises a thermal fuse.

21. The rechargeable battery pack according to claim 19, wherein said thermal protector element comprises a positive temperature coefficient thermistor.

22. The rechargeable battery pack according to claim 19, wherein said thermal protector element comprises a thermal breaker.

23. The rechargeable battery pack according to claim 19, wherein said third electronic switching device comprises a bipolar junction transistor.

24. The rechargeable battery pack according to claim 16, wherein the first electronic switching device and the second electronic switching device is each a MOSFET.

25. The rechargeable battery pack according to claim 16, wherein said power cell is a Li-Ion cell.

* * * * *